United States Patent
Zalewski

(10) Patent No.: US 10,580,459 B2
(45) Date of Patent: Mar. 3, 2020

(54) DYNAMIC MEDIA INTERACTION USING TIME-BASED METADATA

(75) Inventor: Gary M. Zalewski, Oakland, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 1658 days.

(21) Appl. No.: 11/844,148

(22) Filed: Aug. 23, 2007

(65) Prior Publication Data

US 2009/0055383 A1 Feb. 26, 2009

(51) Int. Cl.
*H04N 21/8547* (2011.01)
*H04N 21/81* (2011.01)
*H04N 21/475* (2011.01)
*H04N 21/462* (2011.01)
*H04N 21/422* (2011.01)
*H04N 21/45* (2011.01)
*H04N 21/41* (2011.01)
*H04N 5/445* (2011.01)
*G11B 27/10* (2006.01)

(Continued)

(52) U.S. Cl.
CPC ............. *G11B 27/10* (2013.01); *G11B 27/11* (2013.01); *H04N 5/445* (2013.01); *H04N 21/4126* (2013.01); *H04N 21/4222* (2013.01); *H04N 21/42207* (2013.01); *H04N 21/42209* (2013.01); *H04N 21/4532* (2013.01); *H04N 21/4622* (2013.01); *H04N 21/4755* (2013.01); *H04N 21/8133* (2013.01); *H04N 21/8547* (2013.01); *H04N 21/4882* (2013.01)

(58) Field of Classification Search
CPC ....... G06F 1/1647; G11B 27/10; G11B 27/11; H04N 21/4126; H04N 21/42207; H04N 21/42209; H04N 21/4532; H04N 21/42222; H04N 21/4622; H04N 21/4755; H04N 21/8133; H04N 21/8547; H04N 21/4882; H04N 21/4363; H04N 21/8586

See application file for complete search history.

(56) References Cited

U.S. PATENT DOCUMENTS 7,036,083 B1 * 4/2006 Zenith ........................... 715/758
7,200,857 B1 * 4/2007 Rodriguez et al. .............. 725/87

(Continued)

FOREIGN PATENT DOCUMENTS

EP 1053642 11/2000
WO WO-2004/034281 4/2004

OTHER PUBLICATIONS

Unknown, JP 2008-210683 article, Japanese language, PW080056, vol. 97, No. 1, Feb. 4, 1997, Information Processing Society of Japan, pp. 1-5.

(Continued)

*Primary Examiner* — Amanda L Willis
(74) *Attorney, Agent, or Firm* — Penilla IP, APC

(57) ABSTRACT

Systems and methods are provided for linking time-based metadata to media content so that as the metadata changes in synchronicity with media content during play, information associated with the media content can be outreached in the context of the media presentation. More particularly, according to one embodiment of the present invention, a media player device is provided that renders media content and retrieves and displays appropriate metadata information associated with the media content at an appropriate time to an ancillary metadata viewer device during play of a media resource.

20 Claims, 7 Drawing Sheets

(51) Int. Cl.
*G11B 27/11* (2006.01)
*H04N 21/488* (2011.01)

(56) References Cited

U.S. PATENT DOCUMENTS

| | | | |
|---|---|---|---|
| 7,898,504 B2* | 3/2011 | Fischer | 345/9 |
| 2002/0059604 A1 | 5/2002 | Papagan | |
| 2002/0140855 A1 | 10/2002 | Hayes | |
| 2002/0186676 A1* | 12/2002 | Milley et al. | 370/341 |
| 2003/0093790 A1* | 5/2003 | Logan et al. | 725/38 |
| 2003/0152366 A1 | 8/2003 | Kanazawa et al. | 386/69 |
| 2005/0005308 A1* | 1/2005 | Logan et al. | 725/135 |
| 2005/0108026 A1* | 5/2005 | Brierre et al. | 705/1 |
| 2005/0123267 A1 | 6/2005 | Tsumagari | |
| 2005/0193425 A1* | 9/2005 | Sull et al. | 725/135 |
| 2005/0220439 A1* | 10/2005 | Carton et al. | 386/4 |
| 2006/0053472 A1* | 3/2006 | Goto et al. | 725/141 |
| 2007/0136773 A1* | 6/2007 | O'Neil et al. | 725/100 |
| 2007/0169115 A1 | 7/2007 | Ko et al. | 717/174 |
| 2008/0246694 A1* | 10/2008 | Fischer | 345/9 |

OTHER PUBLICATIONS

Unknown, Partial Translation of Ref., "Interactive Video Navigation System by Using the Media Fusion Technique of Video/TV and World Wide Web," 2 pages.

\* cited by examiner

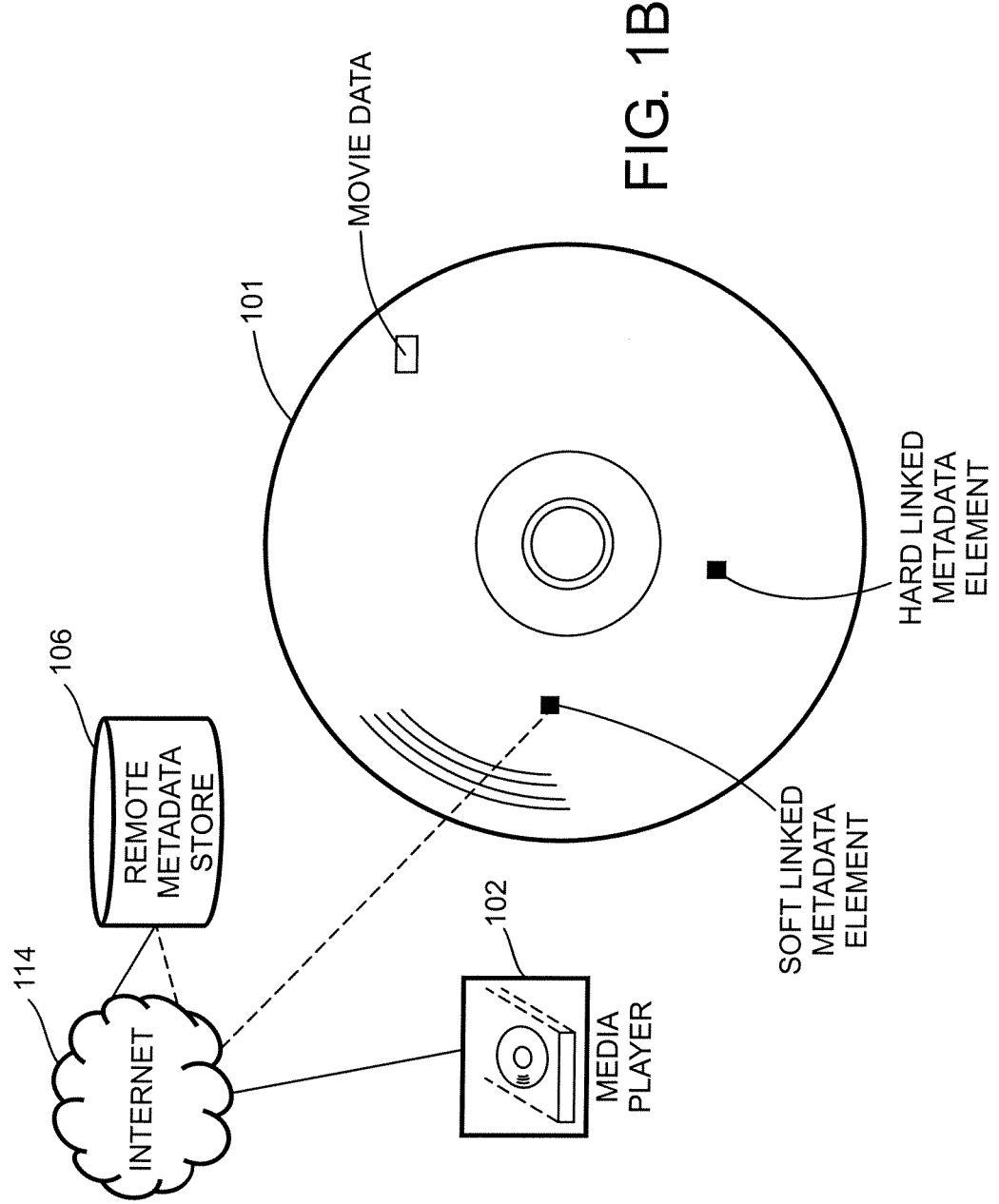

FIG. 3

SHOW ME CATEGORIES:
☐ CATEGORY 1
☑ CATEGORY 2
☐ CATEGORY 3
• • •
☐ ALL

SHOW ME TYPES:
☐ TYPE 1
☐ TYPE 2
☐ TYPE 3
• • •
☑ ALL

DISPLAY:
☐ DURING PRESENTATION (PLAY)
☑ AFTER PLAYBACK (BUNDLE)
SEND BUNDLE TO:
☐ VIEWER DEVICE
☑ EMAIL

302

DYNAMIC MEDIA INTERACTION USING TIME-BASED METADATA

CROSS REFERENCE TO RELATED APPLICATION

The present application is related to U.S. application Ser. No. 11/844,155, entitled "MEDIA DATA PRESENTED WITH TIME-BASED METADATA", filed on Aug. 23, 2007 and incorporated herein by reference.

BACKGROUND

1. Field of the Invention

The invention relates generally to providing an approach for dynamic interaction with a media presentation and, more particularly, to providing an approach for linking time-based metadata to media content so that as the metadata changes in synchronicity with media content during media play or rendering, information associated with the media content can be outreached in the context of the media presentation.

2. Description of the Related Art

Conventionally, metadata is data that is used to describe individual data items or a collection of data items. In other words, metadata is data about data. Metadata can describe a resource itself (e.g. video disc, audio file, etc.), for example, by including the name and size of an audio file. Metadata can also describe the content associated with the resource. For example, in the context of a play of media on a computer or some other electronics device, if the media is an audio file or disc, for instance, the metadata can include artist information, album information, track names, and track numbers, etc. If the media is a video file or disc, the metadata can include actor information, director information, scene titles, production information, etc. However, such conventional uses of metadata are limited because the metadata is static and relates only to a resource as a whole. Moreover, in the limited application where metadata can relate to parts of a resource, namely the use of subtitle tracks on movies, the metadata still remains static, authoritative, and has a single fixed purpose, in addition to being limited solely to text.

In view of the forgoing, there is a need to provide an interactive media experience using dynamic and flexible time-based metadata that can be associated with portions of a resource and can adapt as the portions of the resource it describes changes during media play or presentation.

SUMMARY

Broadly speaking, the present invention provides systems, methods and computer readable media for enabling analysis of media content and metadata of the media content in a streaming manner. One embodiment defines continuous analysis of metadata information during the time a primary media resource is played, viewed, listened-to or otherwise presented. As the content being presented by the primary media resource changes, different context data is presented to an ancillary device. In this manner, a user can receive additional information about a person, place, thing, or combinations thereof which may be appearing in the presented content from the primary media resource.

In one example, the presented content can be from a television broadcast, a video game, a movie, a radio show, or combinations thereof. In any of these presentations, it may be possible that more than one viewer will be present. Each viewer, can thus use his or her own ancillary device to view only the additional information that may of their particular interest. Thus, as the presentation from the primary media resource proceeds, the additional content delivered to the ancillary device will also change. In an alternative embodiment, if the user does not wish to view the additional information in synchronicity, the user can set options through the ancillary device to simply record certain metadata that is of interest during the user's viewing of the primary media. At a later point in time, the user can simply review all of the metadata and/or additional information captured, so that the user's viewing of the primary media is not interrupted.

In one embodiment, a system includes a player device, the player device is capable of rendering content associated with the media resource and retrieving the metadata information when the selected time is reached during the play of the media resource where the metadata information is associated with a segment of the content, and where retrieving the metadata information occurs in synchronicity with the play of the media resource. The system further comprises an ancillary viewer device coupled to the player device, the ancillary viewer device being capable of receiving the metadata information from the player device and displaying the metadata information.

In another embodiment, a computer-implemented method for presenting metadata information for presentation in conjunction with presentation of content rendered from a media source is provided. The method includes presenting the content from the media source on a main display. The content includes images on the main display, and certain images or parts of images on the main display are associated with metadata information. The method receives preference settings defining which of the metadata information should be obtained during the presentation of the content on the main display and then retrieves the metadata information based on the preference settings. The method also forwards the retrieved metadata information to an ancillary device for presentation. The presentation on the ancillary device is processed during the presenting of the content on the main display. The presentation of the retrieved metadata information, as related to the images or parts of images, augments the presentation of the content from the media source on the main display.

Other aspects and advantages of the invention will become apparent from the following detailed description, taken in conjunction with the embodiments and accompanying drawings, illustrating, by way of example, the principles of the invention.

BRIEF DESCRIPTION OF THE DRAWINGS

The invention, together with further advantages thereof, may best be understood by reference to the following description taken in conjunction with the accompanying drawings in which:

FIG. 1B is an illustration of metadata information provided in static format and distributed with the media itself, or provided in dynamic format and accessed from a remote metadata repository, in accordance with an embodiment of the present invention;

FIG. 3 is a user interface of an ancillary viewer device, in accordance with an embodiment of the present invention;

DETAILED DESCRIPTION

Figure 1A:
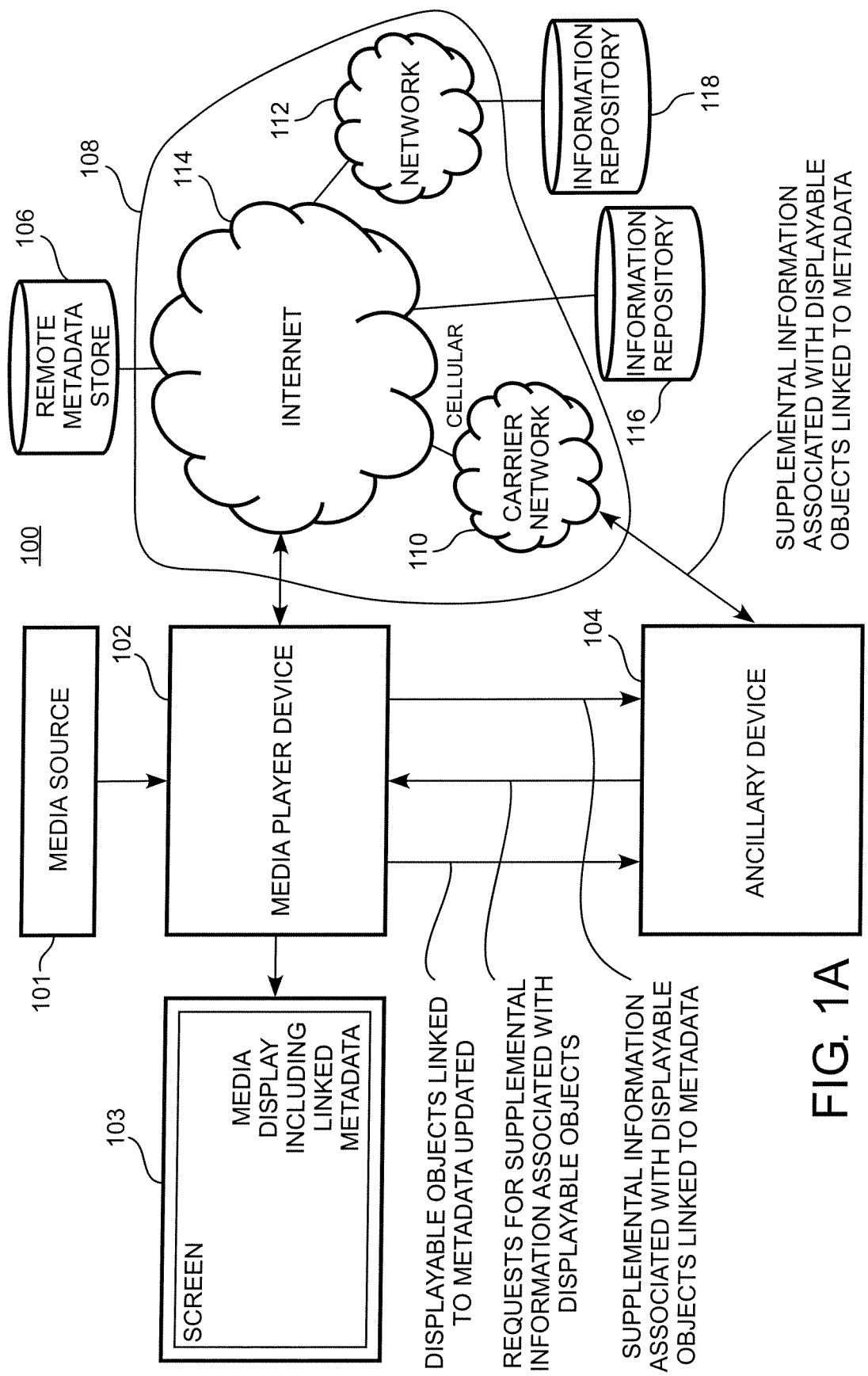
FIG. 1A is an illustration of a system for displaying metadata information at particular times during play of a media resource, in accordance with an embodiment of the present invention.

Embodiments of the present invention provide systems, methods and computer readable media for analyzing media content and metadata of the media content in a streaming manner. One embodiment enables continuous analysis of metadata information of the primary media during presentation, play, replay, viewing, etc. As the content being presented by the primary media resource changes, different context data is presented to an ancillary device. In this manner, a user can receive additional information about a person, place, thing, or combinations thereof, which may be appearing in the presented content from the primary media resource. In one example, the presented content can be from a television broadcast, a video game, a movie, a radio show, or the like.

In any of these presentations, it may be possible that more than one viewer will be present. Each viewer, can thus use his or her own ancillary device to view only the additional information that may be of their particular interest. Thus, as the presentation from the primary media resource proceeds, the additional content delivered to the ancillary device will also change. Users can choose to pause at particular pieces of data delivered to the ancillary device, navigate further on the ancillary device, link to the internet, download data, etc. Then, users can resume back to live synchronization with the primary media resource presentation, or back in time to any time location that may have been presented during the pause.

Accordingly, users viewing a particular presentation can be provided with a rich experience that enables synchronized presentation of contextually related data to ancillary devices. The contextually related data, by use of preference settings, can be custom defined so that multiple users viewing the same original main presentation can have differing ancillary data presentation experiences. As described below, the ancillary devices can take on many forms, so long as a viewing screen is provided and communication is enabled with the primary player, computing device, console, or network.

Still further, embodiments of the present invention provide systems and methods for linking time-based metadata to media content, so that as the metadata changes in synchronicity with media content during play, information associated with the media content can be outreached in the context of the media presentation. More particularly, according to one embodiment of the present invention, a media player device is provided that renders media content and retrieves and displays appropriate metadata information associated with the media content at an appropriate time to an ancillary metadata viewer device during play of a media resource.

In one example, when a particular consumer product, point of interest, geographic destination, actor, song, etc. is observed or mentioned at a particular time during play of the media resource, more detailed information associated with the consumer product, point of interest, geographic destination, actor, song, etc. can be outreached from the media resource itself or from a remote community-based repository and dynamically provided to a user at the ancillary metadata viewer device. Moreover, embodiments of the present invention allow the user to independently obtain and control the display metadata information associated with the content of a media resource during play of the media resource.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. The present invention includes several aspects and is presented below and discussed in connection with the Figures and embodiments.

In FIG. 1A, according to an embodiment of the present invention, is an illustration of a system 100 for displaying metadata information at particular times during play of a media resource. In one embodiment of the present invention, the media resource can be an audio file, video file, video disc, audio disc, or any other multimedia medium. The media resource can be presented in a live broadcast, recorded broadcast, or time shifted broadcast. According to one embodiment, the system 100 includes a media-player device 102 that is capable of rendering content associated with a media resource 101 to a media display 103 and, at the same time, retrieving and providing metadata information associated with the content to an ancillary viewer device 104.

More particularly, in one embodiment, media-player device 102 is capable of correlating timestamps associated with the media resource 101 to correspondingly time stamped metadata so that when a timestamp associated with the media resource 101 is reached during play, the media-player device 102 can dynamically retrieve the appropriate metadata information from the media resource 101 itself or from a remote community-based metadata repository (or datastore) 106 coupled to network system 108 to provide the metadata information to the ancillary viewer device 104. In one embodiment of the present invention, the network system 108 can include several local networks 112 coupled to the Internet 114. Although specific network protocols, physical layers, topologies, and other network properties may be presented herein, embodiments of the present invention are suitable for use with any network system 108 or network 112.

In one embodiment of the present invention, the ancillary viewer device 104 is dynamically updated with displayable objects linked to time-based metadata information in synchronicity with a play of the media resource 101. In another embodiment of the present invention, metadata information displayed on ancillary viewer device 104 can be supplemented with additional community-based information.

The community-based information may include comments from on-line community members, message boards, chat rooms, a wikipedia, etc. As shown in more detail below in FIG. 4, selectable launch points associated with the metadata displayed at the ancillary device 104 can allow a user to initiate requests for the supplemental information. In one embodiment of the present invention, a user's request for supplemental information can be processed via media player device 102. In this case, the request for supplemental information can be sent from ancillary view device 104 to media player device 102 via a local communication link (see FIG. 2). Once the request is received by media player device 102, media player device 102 can retrieve the requested supplemental information via the Internet 114 from an information repository 116 coupled to the Internet 114 or from an information repository 118 coupled to the Internet 114 via a network 112.

Once the supplemental information is retrieved by media player device 102, media player device 102 can forward the requested supplemental information back to ancillary viewer device via a local communication link (not shown). In one embodiment of the present invention, media player device 102 can process user's requests for supplemental information at ancillary device 104 in the background to avoid an interruption of rendering content associated with media source 101, and retrieving and providing metadata information associated with the content to ancillary viewer device 104. In another embodiment of the present invention, a user's request for supplemental information can be processed directly at ancillary viewer device 104. In this case, according to one embodiment of the present invention, ancillary viewer device 104 is coupled to network system 108 and the requested supplemental information can be retrieved by ancillary device 104 via network system 108. For example, where the ancillary device is a cellular phone device, requests for supplemental information can be processed via cellular carrier network 110.

In another example, where ancillary viewer device 104 is a wireless fidelity (WiFi)-capable device, requests for supplemental information can be processed via local carrier network 110. In one embodiment of the present invention, as discussed in further detail below, ancillary viewer device 104 can also be connected to network system 108 for purposes of communicating with the media-player device 102 via the network system 108.

Media-player device 102 illustrated in FIG. 1A, according to one embodiment, can be a home entertainment computer, a game console, a computing system, a networked attached computer, a set-top box, or any other device capable of rendering content associated with media resource while, at the same time, retrieving and providing metadata information associated with the content to ancillary viewer device. Ancillary viewer device 104 illustrated in FIG. 1A, according to one embodiment, can be a cellular phone, an iPhone™, a PlayStation Portable™ (PSP) device, a personal data assistant (PDA), a Blackberry™ device, a television remote control device having a display screen, a laptop computer, or any other electronic device capable of receiving and displaying dynamically updated metadata information from media-player device.

According to one embodiment of the present invention, the time stamped metadata can be text in its simplest form, audio, graphical images, movie clips, games, forms, web pages, interactive content, or any other type of data that the media-player device and ancillary viewer device can process. In addition to being tagged with time stamp information, each piece of metadata can be tagged with a metadata category (e.g. consumer products, related movies, clothing, points of interest, restaurants, geographic locations, actors, artists, people of interest, animals, etc.), and a metadata type (e.g. text, image, sound, etc.), or any other information that facilitates the retrieval and/or display of metadata information at ancillary viewer device. As mentioned above, in one embodiment of the present invention, the metadata can be associated with selectable launch points (e.g. hyperlinks, etc.) that, as discussed below in FIG. 4, allow users to supplement metadata information with community-based information or internet accessible data via network.

In another embodiment of the present invention, as shown in further detail below in FIG. 1B, the metadata can be provided in static format and distributed with the media itself, or the metadata can be provided in dynamic format and accessed by the media-player device or the ancillary viewer device from a remote metadata repository (e.g. flat file or database) over network at the time of play. By providing the metadata in a dynamic format, the metadata is automatically updated if information about the object of the media resource the metadata describes changes.

Figure 2:
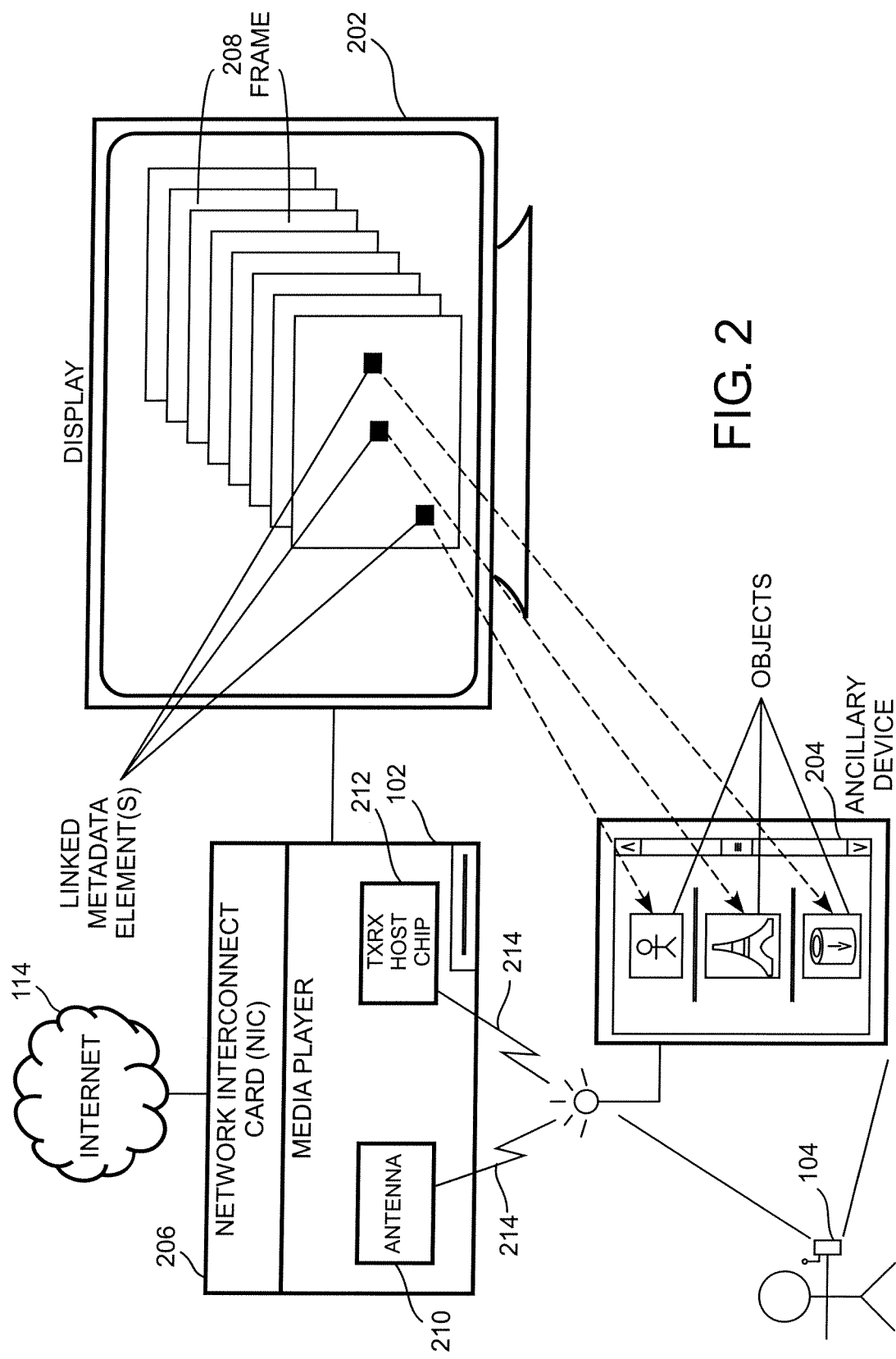
FIG. 2 an exemplary embodiment of the system shown in FIG. 1A.

In FIG. 2, an exemplary embodiment of system 100 is shown including a media-player device 102 that is capable of rendering movie content containing time-stamped metadata on a display 202 such as a television screen. In particular, while media-player device 102 plays a movie on display 202, media-player device 102 can identify each time that an object observed within a frame (or scene) 208 of the movie is linked in time to metadata information. The media-player device 102 can retrieve the metadata information associated with the observed object and download the metadata information to ancillary viewer device 104. The downloaded metadata information is dynamically displayed on a screen 204 of the ancillary viewer device 104 in synchronicity with the changing frames or scenes of the movie. For example, when an actor appears in a scene of the movie, media-player device 102 can download a picture of the actor to ancillary viewer device 104 and/or URLs for web pages containing information about the actor can be downloaded to the ancillary viewer device 104. As the movie progresses, if the actor makes a phone call using a Sony Ericsson™ phone, a URL of the phone manufacturer's web page can be downloaded to the ancillary viewer device 104, or a more detailed explanation of a unique feature of the phone that the actor is taking advantage of can be downloaded to the ancillary viewer device 104.

Media-player device 102 can be connected to the Internet 114 via a network interconnect card (NIC) 206 or any other interconnect mechanism that facilitates connectivity between media-player device 102 and network system 108 for purposes of retrieving metadata information or information that supplements the metadata information. In one embodiment of the present invention, media-device player 102 can include a wireless fidelity (WiFi) antenna 210 or a Bluetooth™ wireless antenna 210, transmit receive (TxRx) host chip 212, or any other mechanism that facilitates connectivity between media-player device 102 and ancillary viewer device 104 via local network link 214.

In FIG. 3, according to one embodiment of the present invention, the display of metadata information downloaded to ancillary viewer device 104 can be independently controlled by a user of the ancillary viewer device 104 from user interface screen 302. In one embodiment of the present invention, user interface screen 302 can be provided by the ancillary device 104 or any other appropriate device to allow a user to select the types and/or categories of metadata information displayed at the ancillary device, how and/or when the metadata information is displayed, how and/or when a user is notified that new metadata information is available, and so on. User interface screen 302 can include toggle selections etc. that allow a user to select the categories (e.g. consumer products, related movies, clothing, points of interest, restaurants, geographic locations, actors, artists, people of interest, and animals, etc.) of metadata information that are downloaded and/or displayed on ancillary viewer device.

User interface screen 302 can also include toggle selections etc. that allow a user to select the type (e.g. text, audio, graphical image, web page, etc.) of metadata information that is downloaded and/or displayed on ancillary viewer device 104. Additionally, user interface screen 302 can include toggle selections etc. that allow the user to select whether to display metadata information as it is encountered during media resource play or whether to provide the metadata information to the user in a bundled format after play of the media resource is complete, for example at the end of a movie. In one embodiment of the present invention, metadata information provided to the user in a bundled format can be sent to a user's ancillary viewer device, a user's email account, or any other destination capable of receiving the metadata information.

Figure 4:
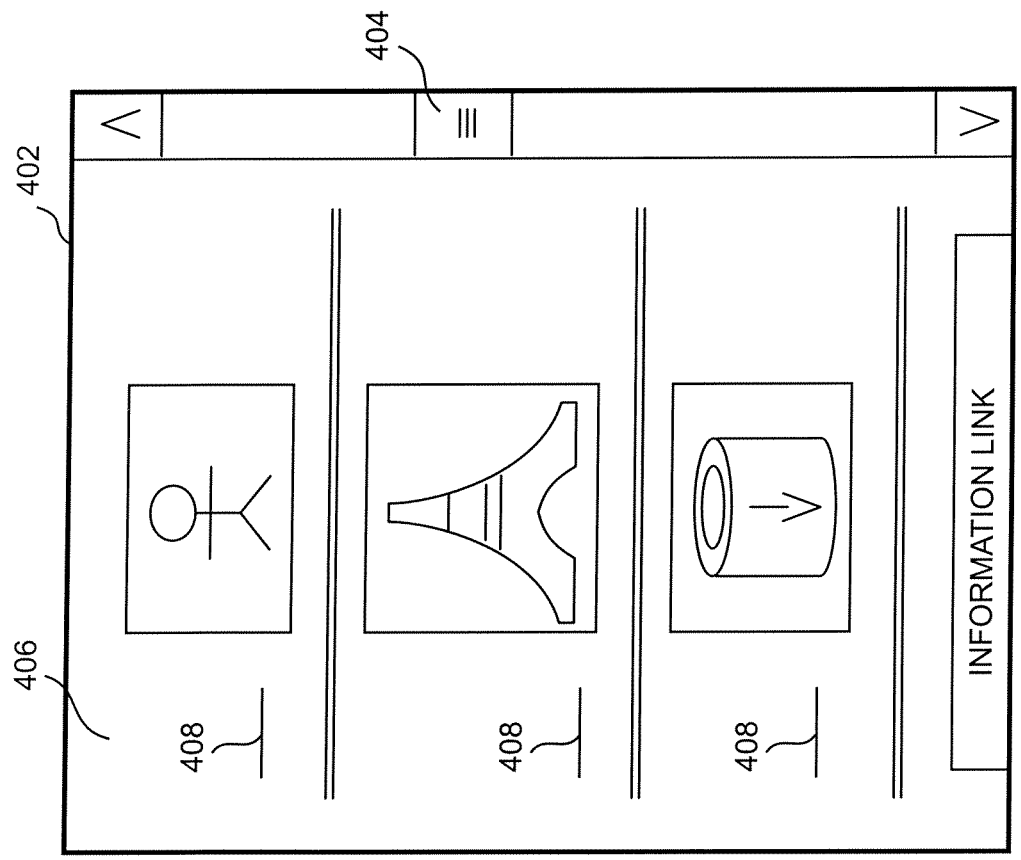
FIG. 4 is a display screen of the ancillary viewer device for display metadata information, in accordance with an embodiment of the present invention.
Figure 4:
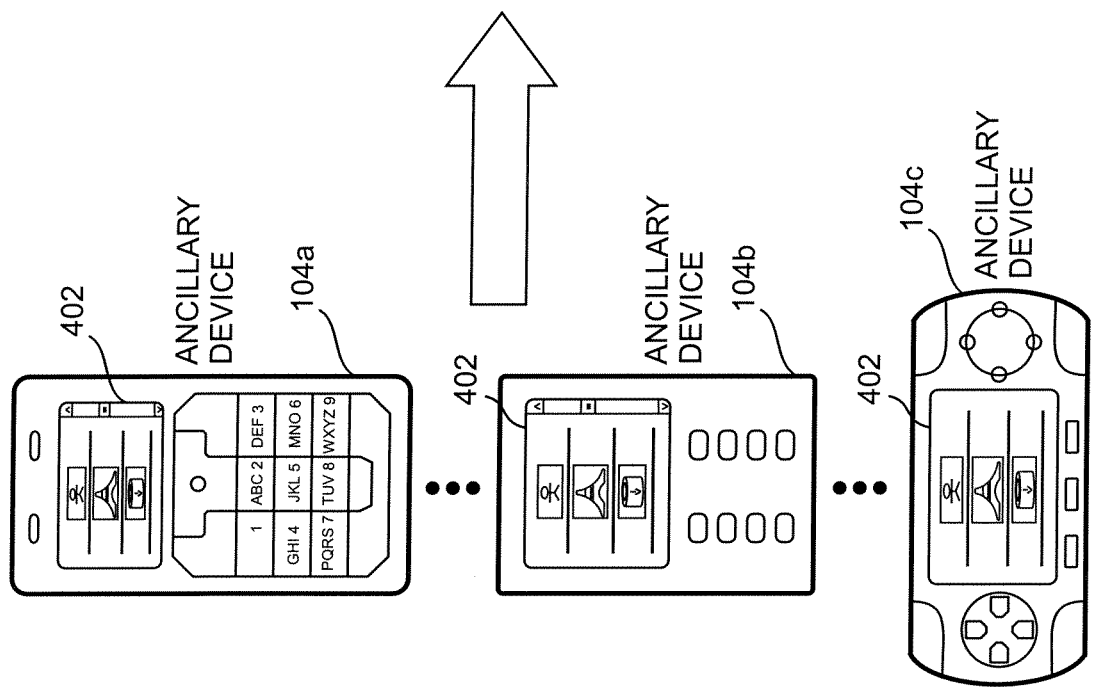

In FIG. 4, according to an embodiment of the present invention, exemplary display screen 402 including metadata information downloaded from media-player device 102 to ancillary viewer device 104 is shown. According to one embodiment of the present invention, each piece of metadata information downloaded from media-player device 102 can be queued within display screen 402. As previously mentioned, metadata information can be provided to and displayed at ancillary device 104 in any one of several formats including, but not limited to, textual, graphical, hyperlink, audio, video, split screens, interactive screens, etc. Display screen 402 can include a scroll bar 404 or any other similar mechanism that allows a user to access metadata information that is not currently displayable within a visible portion 406 of display screen 402. Additionally, in one embodiment of the present invention, selectable launch points 408 or transition springboard queuing effects can be associated with each piece of metadata information to allow a user to supplement downloaded metadata information with community-based information accessible via the Internet, remote or local networks etc., as discussed above regarding FIG. 1A.

For example, user selection of a URL associated with metadata information for a particular movie can cause a request to be sent from ancillary viewer device 104 to media-player device 102 to retrieve movie clips from the movie studio's website. In one embodiment of the present invention, mechanisms for notifying a user when new metadata information is updated on ancillary viewer device can also be provided. For example, visual buzz indicators or sound/vibrate indicators can be provided with ancillary viewer device 104.

Referring still to FIG. 4, according to one embodiment of the present invention, display screen 302 or any other screen used to display metadata or supplemental community-based information on ancillary viewer device 104 can be provided on any type of ancillary viewer device 104a, 104b, 104c. As previously discussed above regarding FIG. 1A, ancillary viewer device can be a cellular phone, a PlayStation Portable™ (PSP) device, a personal data assistant (PDA), a remote control device including a display screen, a laptop computer, or any other electronic device capable of receiving and displaying dynamically updated metadata information from media-player device.

In view of the discussion above, an advantage of embodiments of the present invention is the ability to associate time-stamped or tagged metadata information with a particular moment or time segment of the whole of a work and to provide the metadata information to a user in synchronicity during or after play of the work (e.g., multimedia presentation works). Unlike conventional approaches which associate static metadata with a work as a whole and provide metadata that comprises information only about the whole of the work, the dynamic nature of the time-based metadata of embodiments of the present invention provides additional context. This context is provided not only because of the time association between the metadata and the work and but because of the ability to outreach metadata information from remote community-based repositories, the Internet, etc. that can be frequently updated.

As previously discussed, there are many possible uses of time-based metadata according to embodiments of the present invention that can include, but are not limited to, actor names at their first appearance in a movie, with supplemental information about other roles the actor has played; trivia; goofs; lyrics; tablature; director commentary; soundtrack information; explanation of media or historical events associated with the content of a media resource; advertising or consumer product information associated with product placement-based advertising when a particular consumer product is observed or mentioned during the play of a media resource; and user-generated metadata including questions, trivia, criticism, explanation of reference, links to parodies, etc.

It should be appreciated that embodiments of the present invention as described herein may be incorporated into a video game console. For example, in one embodiment, the bluetooth communication system described herein can be incorporated into the Sony® Playstation 3® entertainment device. It should be further appreciated that embodiments described herein may be implemented as either hardware, software, or a combination thereof.

Figure 5:
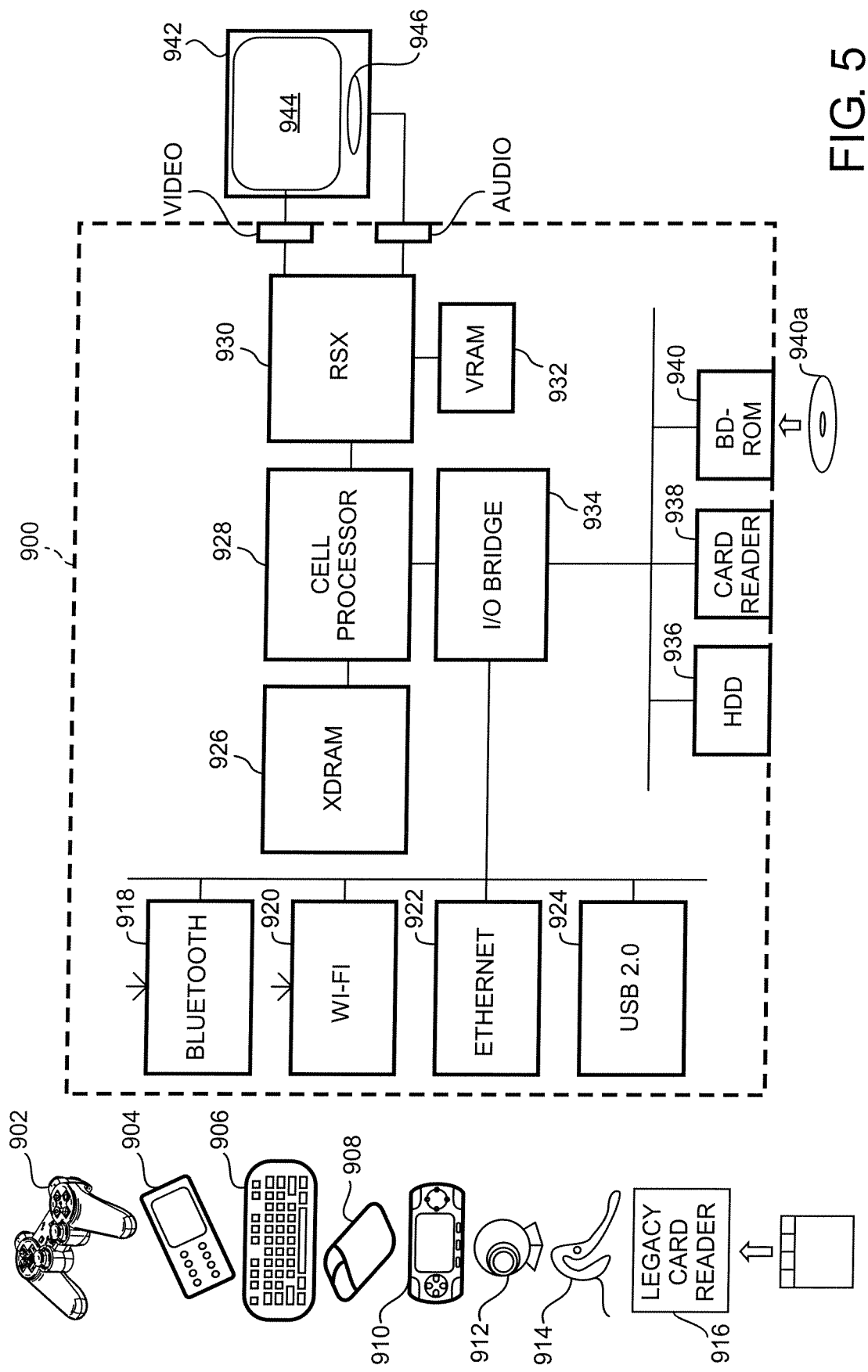
FIG. 5 schematically illustrates the overall system architecture of the Sony® Playstation 3® entertainment device, a console capable of implementing bluetooth communication in accordance with one embodiment of the present invention.

FIG. 5 schematically illustrates the overall system architecture of the Sony® Playstation 3® entertainment device, a console capable of implementing bluetooth communication in accordance with one embodiment of the present invention. A system unit 900 is provided, with various peripheral devices connectable to the system unit 900. The system unit 900 includes a Cell processor 928, a Rambus® dynamic random access memory (XDRAM) unit 926, a Reality Synthesizer graphics unit 930 with a dedicated video random access memory (VRAM) unit 932, and an I/O (input/output) bridge 934. The system unit 900 also includes a Blu Ray® Disk BD-ROM® optical disk reader 940 for reading from a disk 940a and a removable slot-in hard disk drive (HDD) 936, accessible through the I/O bridge 934. Optionally, the system unit 900 also includes a memory card reader 938 for reading compact flash memory cards, Memory Stick® memory cards and the like, which is similarly accessible through the I/O bridge 934.

The I/O bridge 934 also connects to six Universal Serial Bus (USB) 2.0 ports 924, a gigabit Ethernet port 922, an IEEE 802.11b/g wireless network (Wi-Fi) port 920, and a Bluetooth® wireless link port 918 capable of supporting of up to seven Bluetooth connections. In operation the I/O bridge 934 handles all wireless, USB and Ethernet data, including data from one or more game controllers 902. For example when a user is playing a game, the I/O bridge 934 receives data from the game controller 902 via a Bluetooth link and directs it to the Cell processor 928, which updates the current state of the game accordingly.

The wireless, USB, and Ethernet ports also provide connectivity for other peripheral devices in addition to game controllers 902, such as a remote control 904, a keyboard 906, a mouse 908, a portable entertainment device 910 such as a Sony Playstation Portable® entertainment device, a video camera such as an EyeToy® video camera 912, and a microphone headset 914. Such peripheral devices may therefore in principle be connected to the system unit 900 wirelessly. For example, the portable entertainment device 910 may communicate via a Wi-Fi ad-hoc connection, and the microphone headset 914 may communicate via a Bluetooth link. The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners. In addition, a legacy memory card reader 916 may be connected to the system unit via a USB port 924, enabling the reading of memory cards 948 of the kind used by the Playstation® or Playstation 2® devices.

In the present embodiment, the game controller 902 is operable to communicate wirelessly with the system unit 900 via the Bluetooth link. However, the game controller 902 can instead be connected to a USB port, thereby accessing power by which to charge the battery of the game controller 902. In addition to one or more analog joysticks and conventional control buttons, the game controller is sensitive to motion in six degrees of freedom, corresponding to translation and rotation in each axis. Consequently, gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 904 is also operable to communicate wirelessly with the system unit 900 via a Bluetooth link. The remote control 904 includes controls suitable for the operation of the Blu-Ray Disk BD-ROM reader 940 and for the navigation of disk content. The Blu Ray Disk BD-ROM reader 940 is operable to read CD-ROMs compatible with the Playstation and PlayStation 2 devices, in addition to conventional pre-recorded and recordable CDs, and so-called Super Audio CDs. The reader 940 is also operable to read DVD-ROMs compatible with the Playstation 2 and PlayStation 3 devices, in addition to conventional pre-recorded and recordable DVDs. The reader 940 is further operable to read BD-ROMs compatible with the Playstation 3 device, as well as conventional pre-recorded and recordable Blu-Ray Disks.

The system unit 900 is operable to supply audio and video, either generated or decoded by the Playstation 3 device via the Reality Synthesizer graphics unit 930, through audio and video connectors to a display and sound output device 942 such as a monitor or television set having a display 944 and one or more loudspeakers 946. The audio connectors 950 may include conventional analogue and digital outputs whilst the video connectors 952 may variously include component video, S-video, composite video and one or more High Definition Multimedia Interface (HDMI) outputs. Consequently, video output may be in formats such as PAL or NTSC, or in 720$p$, 1080$i$ or 1080$p$ high definition.

Audio processing (generation, decoding and so on) is performed by the Cell processor 928. The Playstation 3 device's operating system supports Dolby® 5.1 surround sound, Dolby® Theatre Surround (DTS), and the decoding of 7.1 surround sound from Blu-Ray® disks.

In the present embodiment, the video camera 912 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 900. The camera LED indicator is arranged to illuminate in response to appropriate control data from the system unit 900, for example to signify adverse lighting conditions. Embodiments of the video camera 912 may variously connect to the system unit 900 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 900, an appropriate piece of software such as a device driver should be provided. Device driver technology is well-known and is not be described in detail herein to avoid unnecessarily obscuring the present invention.

Figure 6:
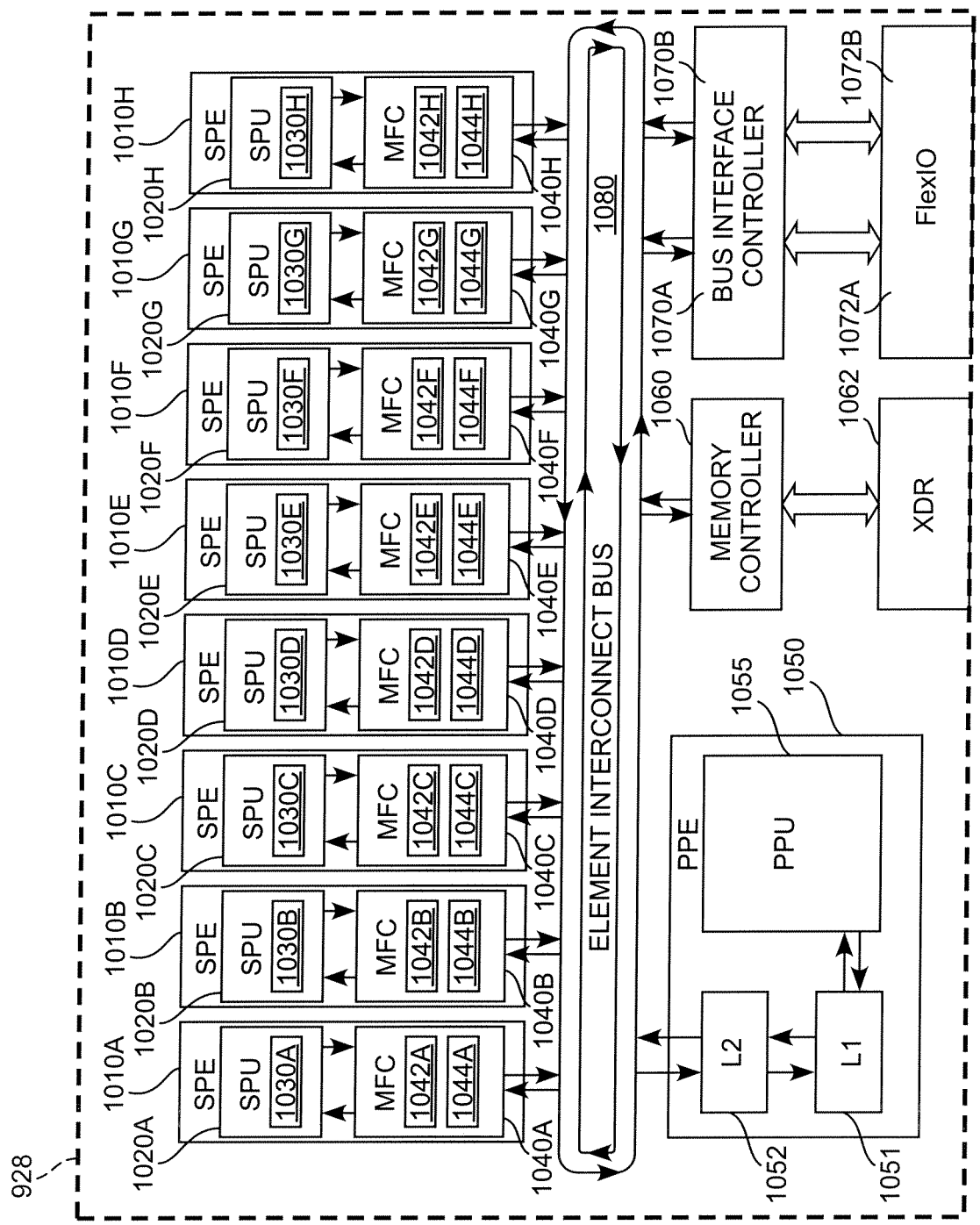
FIG. 6 is a schematic of the cell processor, in accordance with one embodiment of the present invention.

FIG. 6 is a schematic of the Cell processor 928, in accordance with one embodiment of the present invention. The Cell processor 928 has an architecture including four basic components: 1) external input and output structures including a memory controller 1060 and a dual bus interface controller 1070A,B; 2) a main processor referred to as the Power Processing Element 1050; 3) eight co-processors referred to as Synergistic Processing Elements (SPEs) 1010A-H; and 4) a circular data bus connecting the above components referred to as the Element Interconnect Bus 1080. The total floating point performance of the Cell processor is 218 GFLOPS.

The Power Processing Element (PPE) 1050 is based upon a two-way simultaneous multithreading Power 970 compliant PowerPC core (PPU) 1055 running with an internal clock of 3.2 GHz. It comprises a 512 kB level 2 (L2) cache and a 32 kB level 1 (L1) cache. The PPE 1050 is capable of eight single position operations per clock cycle, translating to 25.6 GFLOPs at 3.2 GHz. The primary role of the PPE 1050 is to act as a controller for the Synergistic Processing Elements 1010A-H, which handle most of the computational workload. In operation the PPE 1050 maintains a job queue, scheduling jobs for the Synergistic Processing Elements 1010A-H and monitoring their progress. Consequently, each Synergistic Processing Element 1010A-H runs a kernel whose role is to fetch a job, execute it and synchronizes with the PPE 1050.

Each Synergistic Processing Element (SPE) 1010A-H includes a respective Synergistic Processing Unit (SPU) 1020A-H, and a respective Memory Flow Controller (MFC) 1040A-H including in turn a respective Dynamic Memory Access Controller (DMAC) 1042A-H, a respective Memory Management Unit (MMU) 1044A-H and a bus interface (not shown). Each SPU 1020A-H is a RISC processor clocked at 3.2 GHz and including 256 kB local RAM 1030A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1020A-H does not directly access the system memory XDRAM 926. The 64-bit addresses formed by the SPU 1020A-H are passed to the MFC 1040A-H which instructs its DMA controller 1042A-H to access memory via the Element Interconnect Bus 1080 and the memory controller 1060.

The Element Interconnect Bus (EIB) 1080 is a logically circular communication bus internal to the Cell processor 928 which connects the above processor elements, namely the PPE 1050, the memory controller 1060, the dual bus interface 1070A,B and the 8 SPEs 1010A-H, totaling 12 participants. Participants can simultaneously read and write to the bus at a rate of 8 bytes per clock cycle. As noted previously, each SPE 1010A-H comprises a DMAC 1042A-H for scheduling longer read or write sequences. The EIB comprises four channels, two each in clockwise and anti-clockwise directions. Consequently, for twelve participants, the longest step-wise data-flow between any two participants is six steps in the appropriate direction. The theoretical peak instantaneous EIB bandwidth for 12 slots is therefore 96 B per clock, in the event of full utilization through arbitration between participants. This equates to a theoretical peak bandwidth of 307.2 GB/s (gigabytes per second) at a clock rate of 3.2 GHz.

The memory controller 1060 comprises an XDRAM interface 1062, developed by Rambus Incorporated. The memory controller interfaces with the Rambus XDRAM 926 with a theoretical peak bandwidth of 25.6 GB/s. The dual bus interface 1070A,B comprises a Rambus FlexIO® system interface 1072A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 700 via controller 170A and the Reality Simulator graphics unit 200 via controller 170B. Data sent by the Cell processor 928 to the Reality Simulator graphics unit 930 will typically comprise display lists, being a sequence of commands to draw vertices, apply textures to polygons, specify lighting conditions, and so on.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Also, any of the operations described herein that form part of the invention can be performed by any suitable structural "means" that provide capability for performing the recited functionality. For instance, example structure is provided by way of the circuitry components referred to in the various embodiments of the claimed invention.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claim.

What is claimed is:

1. A computer-implemented method for presenting supplemental content on one or more ancillary devices, comprising:

establishing, by a computing system, a wireless connection between the one or more ancillary devices and a main display, the computing system is local to the one or more ancillary devices and the main display;

detecting, by the computing system, presentation of content of a media source on the main display while the one or more ancillary devices and the main display are connected, wherein certain images or parts of images within the content are associated with respective metadata information, that is time-based and identifies supplemental content that is in addition to the content of the media source, and the respective metadata information is not subtitle data;

receiving at the computing system respective preference settings for the one or more ancillary devices, the respective preference settings are defined for descriptive content categories via a user interface by a user while interfacing with one of the one or more ancillary devices, the respective preference settings is used for identifying which of the respective metadata information is to be processed for retrieving respective supplemental content for each of the one or more ancillary devices, wherein respective supplemental content related to the processed metadata information is displayed on the one or more ancillary devices during the presentation of the content on the main display, and the respective metadata information available for processing during presentation of the content changes in synchronicity as the content changes during presentation of the content on the main display;

retrieving, by the computing system, the respective supplemental content from one or more online sources, the respective supplemental content are not obtained via the media source; and sending, by the computing system during presentation of the content of the media source on the main display, the respective supplemental content to each of the one or more ancillary devices for display, the respective supplemental content identified by the processed metadata information based on the respective preference settings for the user during presentation of the content, the respectively sent supplemental content information being for display at the one or more ancillary devices, and wherein at least one sent supplemental content includes one or more internet links for accessing additional information regarding the supplemental content, and at least one sent supplemental content includes one or more comments from an on-line community, the one or more ancillary devices providing a navigation interface for enabling viewing of the supplemental content and access to the one or more internet links and the one or more comments from the on-line community, wherein each of the one or more ancillary devices is sent respective supplemental content that is customized based on respective preference settings;

the method being executed by a processor, wherein the respective supplemental content sent for viewing on the one or more ancillary devices automatically changes in synchronicity with a change of presentation of the content on the main display.

2. The method of claim 1, wherein the one or more ancillary devices includes at least two ancillary devices, the at least two ancillary devices being connected to the main display via the wireless connection.

3. The method of claim 1, wherein the one or more ancillary devices includes at least two ancillary devices, and wherein the respective supplemental content that is sent to each of the two or more ancillary devices is different.

4. The method of claim 1, wherein the preference settings further define whether to bundle the supplemental content, such that the bundle of supplemental content is made accessible at a destination for storage and viewing when access is made at the destination.

5. The method of claim 1, wherein the descriptive content categories defined for the preference settings further define metadata categories of the metadata information to retrieve or exclude.

6. The method of claim 5, wherein the metadata categories includes one or more of consumer products, related movies, related songs, clothing, points of interest, restaurants, geographic locations, actors, artists, people of interest, animals, or combinations thereof.

7. The method of claim 1, wherein the supplemental content further includes one of or more of text, audio, video, graphical image, web page, or combinations thereof.

8. The method of claim 1, wherein the supplemental content is set for presentation during the presenting of the content on the main display based on a time stamp.

9. The method of claim 1, further comprising,
pausing presentation of the content on the main display when the supplemental content is accessed at the ancillary device; and
resuming presentation of the content on the main display after the pausing.

10. A computer-implemented method for sending supplemental content to one or more ancillary devices during presentation of content on a main display, comprising:
establishing, by a computing system, a wireless connection between the one or more ancillary devices and the main display, the computing system is local to the one or more ancillary devices and the main display;
detecting, by the computing system, presentation of content on the main display while the one or more ancillary devices and the main display are connected, wherein some images or parts of images within the content are associated with respective metadata information that identifies supplemental content that is not displayed on the main display but relates to the content being displayed on the main display, the metadata information being associated with a time-base, the metadata information is not subtitle data;
receiving at the computing system, respective preference settings for the one or more ancillary devices, the respective preference settings are defined for descriptive content categories by a user while interfacing with one of the one or more ancillary devices, the respective preference settings is used for identifying which of the respective metadata information is to be processed based on the respective preference settings and based on the images or parts of images being presented in the content on the main display, wherein respective supplemental content related to the processed metadata information is sent for display on each of the one or more ancillary devices during the presentation of the content on the main display;
the computing system continually updates the metadata information available for processing by synchronizing the time-base of the metadata information changes to content being presented on the main display, while the ancillary device and the main display are connected;
retrieving, by the computing system, the respective supplemental content from one or more online sources, the one or more online sources not associated with the media source;
sending, by the computing system, for content displayed on the main display, the respective supplemental content to each of the one or more ancillary devices for display, the respective supplementary content identified by the processed metadata information based on the respective preference settings for the user, the one or more ancillary devices renders the sent supplemental content information, wherein at least one sent supplemental content includes one or more comments from an on-line community, the one or more ancillary devices providing a navigation interface for enabling viewing of the supplemental content and access to the one or more internet links and the one or more comments from the on-line community, wherein each of the one or more ancillary devices is sent respective supplemental content that is customized based on respective preference settings;
pausing presentation of the content on the main display when the respective supplemental content is accessed by at least one of the one or more ancillary devices; and
resuming presentation of the content on the main display after the pausing, the method being executed by a processor of the computing system, wherein the respective supplemental content sent for viewing on the one or more ancillary devices automatically changes in synchronicity with a change of content on the main display.

11. The method of claim 10, wherein the supplemental content further includes internet accessible content, or online message boards, or chat, or Wikipedia data, or one of or more of text, audio, video, graphical image, web page, or combinations thereof.

12. The method of claim 10, wherein the one or more ancillary devices includes at least two ancillary devices, and wherein the respective supplemental content that is sent to each of the two or more ancillary devices is different.

13. The method of claim 10, wherein the preference settings define metadata categories of the metadata information to retrieve or exclude.

14. The method of claim 10, wherein the preference settings enable identification of one or more of consumer products, related movies, related songs, clothing, points of interest, restaurants, geographic locations, actors, artists, people of interest, animals, or combinations thereof.

15. The method of claim 10, wherein the one or more ancillary devices includes two or more ancillary devices, the two or more ancillary devices being connected to the main display via the wireless connection.

16. A computer-implemented method for sending supplemental content to one or more ancillary devices during presentation of content on a main display, comprising:

establishing, by a media player device, a wireless connection between the one or more ancillary devices and the main display, the media player is local to the one or more ancillary devices and the main display;

detecting, by the media player device, presentation of content on a main display while the one or more ancillary devices and the main display are connected, wherein some parts of content are associated with respective metadata information that identifies supplemental content that is not displayed on the main display but relates to the content being displayed on the main display, the respective metadata information being associated with a time-base, the metadata information is not subtitle data;

receiving at the media player device respective preference settings for the one or more ancillary devices, the respective preference settings are defined for descriptive content categories by a user while interfacing with one of the one or more ancillary devices, the respective preference settings is used for identifying which of the respective metadata information is to be processed, wherein respective supplemental content related to the processed metadata information is sent for display on each of the one or more ancillary devices during the presentation of the content on the main display;

accessing, by the media player device, a community datastore for the user that includes comments from members of an online community, the comments being related to the metadata information and added by one or more of the members of the online community;

the media player device continually updates the metadata information available for processing by synchronizing the time-base of the metadata information to changes to content being presented on the main display, while the ancillary device and the main display are connected;

retrieving, by the media player device, the respective supplemental content from one or more online sources, the one or more online sources are not obtained via the media source; and sending, by the media player device, for content displayed on the main display, the respective supplemental content to each of the one or more ancillary devices for display, the respective supplemental content identified by the processed metadata information based on the respective preference settings for the user, the one or more ancillary devices renders the sent supplemental content information, the one or more ancillary devices providing a navigation interface for enabling viewing of the supplemental content and access to the one or more internet links and one or more comments from the online community, wherein each of the one or more ancillary devices is sent respective supplemental content that is customized based on respective preference settings;

the method being executed by a processor of the media player device, wherein the respective supplemental content sent to the one or more ancillary devices automatically change in synchronicity with changes to content of the main display.

17. The computer-implemented method of claim 16, wherein the comments further include a chat or message interface for enabling the user to communicate with one or more of the members of the online community regarding the content displayed on the main display.

18. The computer-implemented method of claim 16, wherein the one or more ancillary devices includes at least two ancillary devices, and wherein the respective supplemental content that is sent to each of the two or more ancillary devices is different.

19. The computer-implemented method of claim 16, wherein the supplemental content relates to categories that includes one or more of consumer products, related movies, related songs, clothing, points of interest, restaurants, geographic locations, actors, artists, people of interest, animals, or combinations thereof, or includes one of or more of text, audio, video, graphical image, web page, or combinations thereof.

20. The computer-implemented method of claim 16, wherein the preference settings further define whether to bundle the supplemental content, such that the bundle of supplemental content is made accessible at a destination for storage and viewing when access is made at the destination.

* * * * *